United States Patent
Casse

(10) Patent No.: US 9,604,716 B2
(45) Date of Patent: Mar. 28, 2017

(54) AIRCRAFT HINGE ARRANGED BETWEEN A MOVABLE PANEL AND A LOAD-BEARING STRUCTURE

(71) Applicant: Airbus Operations (S.A.S.), Toulouse (FR)

(72) Inventor: Christophe Casse, Fenouillet (FR)

(73) Assignee: Airbus Operations (S.A.S.), Toulouse (FR)

( * ) Notice: Subject to any disclaimer, the term of this patent is extended or adjusted under 35 U.S.C. 154(b) by 0 days.

(21) Appl. No.: 14/566,299

(22) Filed: Dec. 10, 2014

(65) Prior Publication Data

US 2015/0166171 A1 Jun. 18, 2015

(30) Foreign Application Priority Data

Dec. 11, 2013 (FR) ..................... 13 62434

(51) Int. Cl.
*B64C 9/02* (2006.01)
*E05D 1/02* (2006.01)

(52) U.S. Cl.
CPC .................. *B64C 9/02* (2013.01); *E05D 1/02* (2013.01); *E05Y 2900/502* (2013.01); *Y10T 16/5257* (2015.01)

(58) Field of Classification Search
CPC ............... B64C 3/48; B64C 2003/445; B64C 2003/543; B64C 9/02; B64C 9/14; B64C 9/16; B64C 9/18; B64C 9/20; B64C 2009/143; Y10T 16/525; Y10T 16/5253; Y10T 16/5257; E05D 1/00; E05D 1/02; E05D 9/00; E05D 9/005
See application file for complete search history.

(56) References Cited

U.S. PATENT DOCUMENTS 3,751,760 A * 8/1973 Wakeman ................ E05D 1/00
16/227
5,098,043 A * 3/1992 Arena ..................... B64C 13/26
244/215
5,318,422 A 6/1994 Erland
(Continued)

FOREIGN PATENT DOCUMENTS

DE 956915 C 1/1957
DE 3908256 A1 9/1990
(Continued)

OTHER PUBLICATIONS

English machine language translation of DE 956915, as disclosed by Applicant.*
(Continued)

*Primary Examiner* — Tien Dinh
*Assistant Examiner* — Alexander V Giczy
(74) *Attorney, Agent, or Firm* — Jenkins, Wilson, Taylor & Hunt, P.A.

(57) ABSTRACT

A movable panel such as an aileron is connected to a load-bearing structure such as a wing of an aircraft by hinges which comprise flexible, elastic plates which are juxtaposed and are provided at opposite angles so as to allow the panel to rotate in an easy manner in response to the movements of an actuator; the hinges are, however, rigid in regard to other loads, such as aerodynamic suction loads, such that inadmissible travel of the panel is avoided.

6 Claims, 3 Drawing Sheets

(56) References Cited

U.S. PATENT DOCUMENTS

| | | | | |
|---|---|---|---|---|
| 5,388,788 | A | * | 2/1995 | Rudolph .................. B64C 7/00 244/212 |
| 5,463,795 | A | | 11/1995 | Carlson et al. |
| 6,027,074 | A | * | 2/2000 | Cameron ................. B64C 1/12 16/225 |
| 6,076,766 | A | * | 6/2000 | Gruensfelder ............ B64C 3/56 244/130 |
| 6,145,791 | A | * | 11/2000 | Diller ....................... B64C 9/02 244/130 |
| 6,349,903 | B2 | * | 2/2002 | Caton ...................... B64C 7/00 244/213 |
| 6,474,945 | B1 | * | 11/2002 | Nakasato .............. B64C 27/615 29/889.7 |
| 7,051,982 | B1 | * | 5/2006 | Johnson ................... B64C 9/02 244/129.1 |
| 2005/0175399 | A1 | | 8/2005 | Perez-Sanchez |
| 2006/0200946 | A1 | * | 9/2006 | Barnett .................... E05D 3/08 16/366 |
| 2010/0314810 | A1 | * | 12/2010 | Cagle ....................... F16F 3/02 267/110 |

FOREIGN PATENT DOCUMENTS

| | | |
|---|---|---|
| EP | 1085152 A2 | 3/2001 |
| WO | WO-03/062052 A1 | 7/2003 |

OTHER PUBLICATIONS

French Search Report for Application No. 1362434 dated Jul. 1, 2014.

* cited by examiner

AIRCRAFT HINGE ARRANGED BETWEEN A MOVABLE PANEL AND A LOAD-BEARING STRUCTURE

CROSS-REFERENCE TO RELATED APPLICATION

This application claims the benefit of and priority to French Patent Application No. 13 62434 filed Dec. 11, 2013, the entire disclosure of which is incorporated by reference herein.

TECHNICAL FIELD

This disclosure relates to an aircraft hinge which is arranged between a movable aircraft panel, which can comprise an aileron or a rudder, and a load-bearing structure associated with the aircraft, which can be a wing or another element connected to the fuselage.

BACKGROUND

Ailerons and rudders must be freely tilted in order to modify the trajectory of the aircraft. They are therefore pivoted to the structures which bear them by hinges. In general, common type hinges are used, comprising a pivot which is fixed to the load-bearing structure, with which the movable panels engage by rotational pins. The orientation of the panels is determined by the control system for the actuators such as cylinders, the opposite ends of which are pivoted to the panels and to the load-bearing structure, a lever arm being formed on the panels between the axis of rotation and the pivot point of the actuator. It could be considered, however, that the hinges are relatively bulky and heavy. Precautions also have to be taken against the possibility of jamming, since certain hinges have to be used simultaneously in practice in order to support each of the panels, by distributing them over the connection line between the panel and the load-bearing structure: the alignment between the axes of the hinges must be respected perfectly, which makes it necessary to construct one fixed hinge and the others floating, that is to say with play. The freedom, however, has to be reconciled with the need to hold the panel against excessive movements due to aerodynamic forces or gravity, which makes it necessary to add stop devices and makes the assembly more complicated.

A simplified device has been proposed in document U.S. Pat. No. 5,463,794 A and consists in a hinge which comprises a flexible plate, the opposite ends of which are embedded in the load-bearing structure and the panel. A pivot point is formed on the hinge indenting it at its middle, so as to give it a reduced thickness locally. The actuators therefore cause the plate to deform appreciably by making it take up variable angles, the apex of which coincides with the location of the indentation. The design hardly seems admissible, however, since the angles formed by the plate have to remain very small in order to avoid plastic mechanical constraints around the indentation. There is also a risk of either fatigue cracking in the case of metal plates, or delamination in the case of composite plates which are formed by stacked layers.

SUMMARY

An object of the disclosure herein is a different type of hinge, the principle characteristics of which are simplicity of composition joined with reliable mechanical strength, which is likely to improve the traditional design by allowing simplified assemblies between the movable aircraft panel and the structure which carries it, without including the weak points as in the design in the document mentioned above.

In a general form, the disclosure herein thus relates to an assembly which comprises a panel of an aircraft and a load-bearing structure of the aircraft and a hinge which is positioned between the panel and the load-bearing structure. The hinge comprises at least two plates which are a flexible, elastic material, each of the plates comprising a first end which is fixed to the panel, a second opposite end which is fixed to the load-bearing structure and a free intermediate part between the panel and the load-bearing structure, and the intermediate parts intersect at an intersection point. The assembly comprises an actuator which is pivoted between the panel and the load-bearing structure and is arranged under the hinge; it also comprises a first pivot point on the load-bearing structure and a second pivot point on the panel, and the actuator comprises a first end which is mounted on the load-bearing structure at the first pivot point and a second end which is mounted on the panel at the second pivot point. The second pivot point of the assembly according to the disclosure is aligned with the intersection point along an axis which is perpendicular to a longitudinal axis of the actuator passing through the first and the second end of the actuator.

Thanks to the particular arrangement of the actuator, the rotational angles of the hinge are imposed in a convenient and precise manner.

In a preferred manner, the assembly according to the disclosure also comprises a first tongue which is associated with the panel and a second tongue which is associated with the load-bearing structure, such that:

the first and second tongues each comprise a bottom surface and a top surface;
the first ends of the two plates are each fixed on a surface of the first tongue; and
the second ends are each fixed on a surface of the second tongue, opposite the first ends with regard to the intersection point.

According to an embodiment variant, the hinge of the assembly according to the disclosure comprises at least three plates which are arranged at alternate angles along the direction of the connection between the panel and the load-bearing structure.

According to another embodiment variant, the hinge of the assembly according to the disclosure comprises a pliable sheet which covers the plates and is fixed by opposite edges to the panel and to the load-bearing structure.

According to yet another embodiment variant, the hinge of the assembly according to the disclosure comprises an elastomer block in which the plates are embedded.

Finally, the disclosure relates to an aircraft which comprises an assembly according to the disclosure.

BRIEF DESCRIPTION OF THE DRAWINGS

The disclosure will now be described in more detail in conjunction with the following figures which represent the different aspects and characters of certain embodiments, not excluding any others.

DETAILED DESCRIPTION

Figure 1:
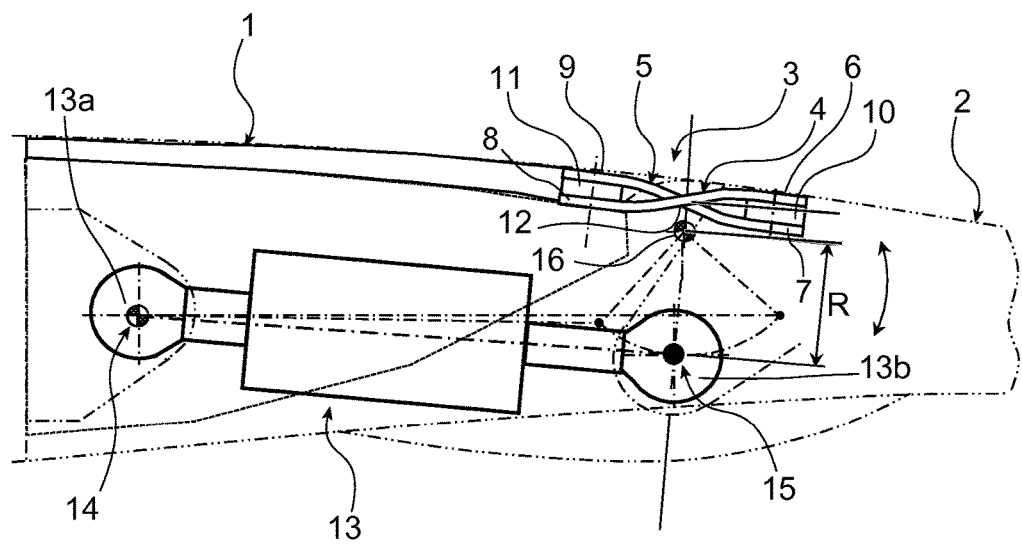
FIG. 1 is a view of a first embodiment of the disclosure.
Figure 2:
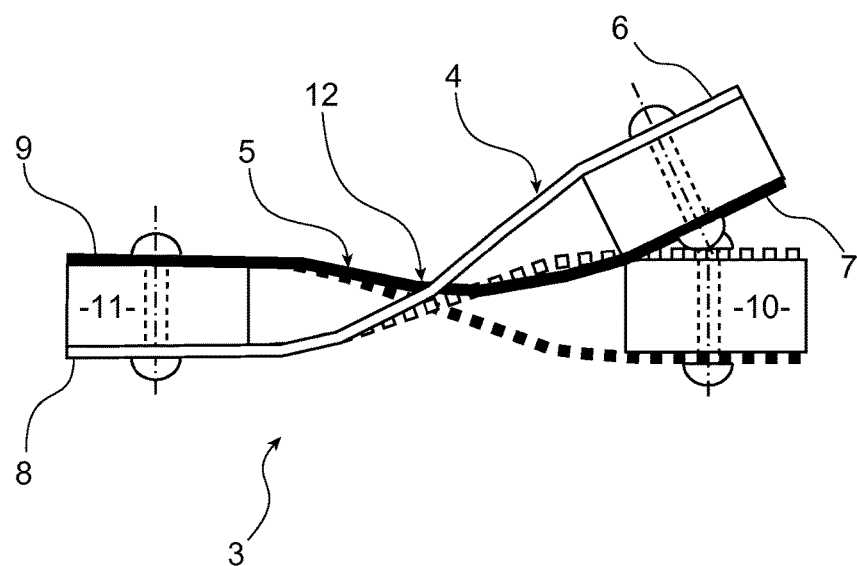
FIG. 2 shows the mechanism of the hinge.

In the embodiment described in FIG. 1, the trailing edge of a wing 1 is shown in the transverse direction of the aircraft. The wing 1 is extended by an aileron 2 and it is connected to a hinge 3 which will be described in detail by FIG. 2. The hinge 3 comprises two elastic, flexible plates 4 and 5 which are juxtaposed in the connection line between the wing 1 and the aileron 2 (in this case the transverse direction of the aircraft), and each of which comprises a first end, 6 and 7 respectively, which is fixed to the aileron 2, and a second end, 8 and 9 respectively, which is opposite the preceding one and is fixed to the wing 1. The fixings are made in this case more precisely on the rigid tongues 10 and 11, which are associated respectively with the aileron 2 and with the wing 1 and are each provided with parallel top and bottom surfaces. The tongues 10 and 11 have appreciably the same thickness, are situated at the same level and are appreciably facing one another when the aileron and the wing are mounted. The first end 8 of the plate 4 is fixed to the bottom surface of the tongue 11 and its opposite end 6 is fixed to the top face of the tongue 10; the reverse arrangement exists for the plate 5, the first end 9 of which is fixed on the top face of the tongue 11 and the opposite face 7 is fixed on the bottom face of the tongue 10. Thus, the plates 4 and 5 are at opposite angles and, in the sense of reading from left to right, the plate 4 is called the "ascending plate" and the plate 5 is called the "descending plate". When viewed along the direction of the connection between the wing 1 and the aileron 2, the plates 4 and 5 have an X-shaped arrangement; the plates 4 and 5 intersect at an intersection point which is given the reference 12.

The device is completed by an actuator 13 (can be seen in FIG. 1), which is a cylinder, a first end 13a of which is mounted on the wing 1 at a first pivot point 14 and a second end 13b is mounted on the aileron 2 at a second pivot point 15. The actuator 13 is arranged under the hinge 3 such that:
  the longitudinal axis of the actuator 13 is merged with the straight line passing through the pivot points 14 and 15 and parallel with the longitudinal axis of the hinge 3, passing through the ends 8 and 7 of the hinge; and
  the pivot point 15 of the actuator 13 is aligned with the intersection point 12 of the hinge 3 in a plane perpendicular to the longitudinal axis of the actuator 13.

When a variation in the length of the actuator 13 is controlled, the plates 4 and 5 fold (FIG. 2) and the hinge 3 deforms, thus causing the aileron 2 to rotate around an axis of rotation 16. The axis 16 is intrinsic to the mounting of the assembly of hinge 3 and the actuator 13 on the wing 1 and the aileron 2. The axis 16 is aligned with the intersection point 12 and the pivot point 15 and is situated between the two points, generally not far from the intersection point 12 of the plates 4 and 5. The distance component between the axis 16 and the pivot point 15, in the direction perpendicular to the direction of extension of the actuator 13, thus forms a lever arm R, that advantageously can be chosen to be as large as possible in order to exert the same degree of rotational effort on the aileron 2 by a weaker and therefore smaller and lighter actuator 13.

The plates 4 and 5 can be constructed in metal (steel, titanium, etc.), or in composite material, according to whether the characteristics of elasticity, fatigue strength or something else are to be prioritized.

Figure 3:
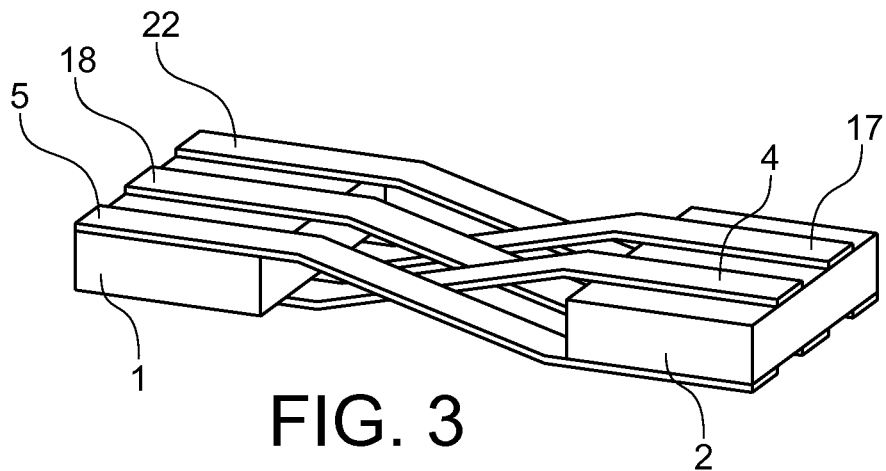
FIG. 3 shows a perspective view of the hinge.

The hinge 3 can comprise plates other than those shown in FIG. 3: it still comprises one plate 17 similar to the plate 4 and two plates 18 and 22 similar to the plate 5. Such an arrangement allows the hinge 3 to be strengthened and to increase its stability against twisting movements. For this reason it is advantageous to alternate the "ascending" plates 4 and 17 from the wing 1 to the aileron 2 and the "descending" plates 5, 18 and 22.

Figure 4:
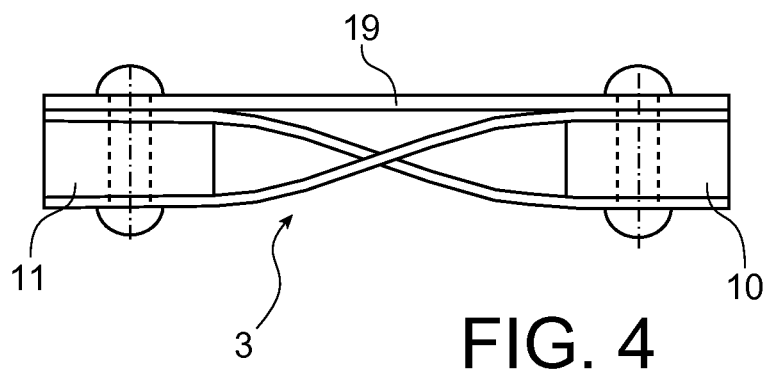
FIGS. 4 and 5 show two embodiment variants.
Figure 5:
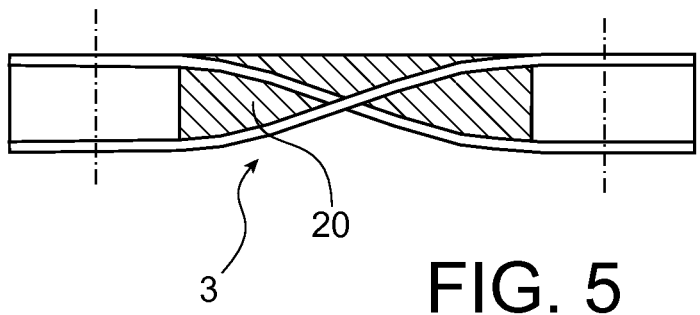

The appearance of the hinge 3 can be improved if it is covered by a pliable sheet 19 (FIG. 4), the ends of which are fixed to the top faces of the tongues 10 and 11, or if the plates 4 and 5 are embedded in an elastomer block 20 (FIG. 5).

Figure 6:
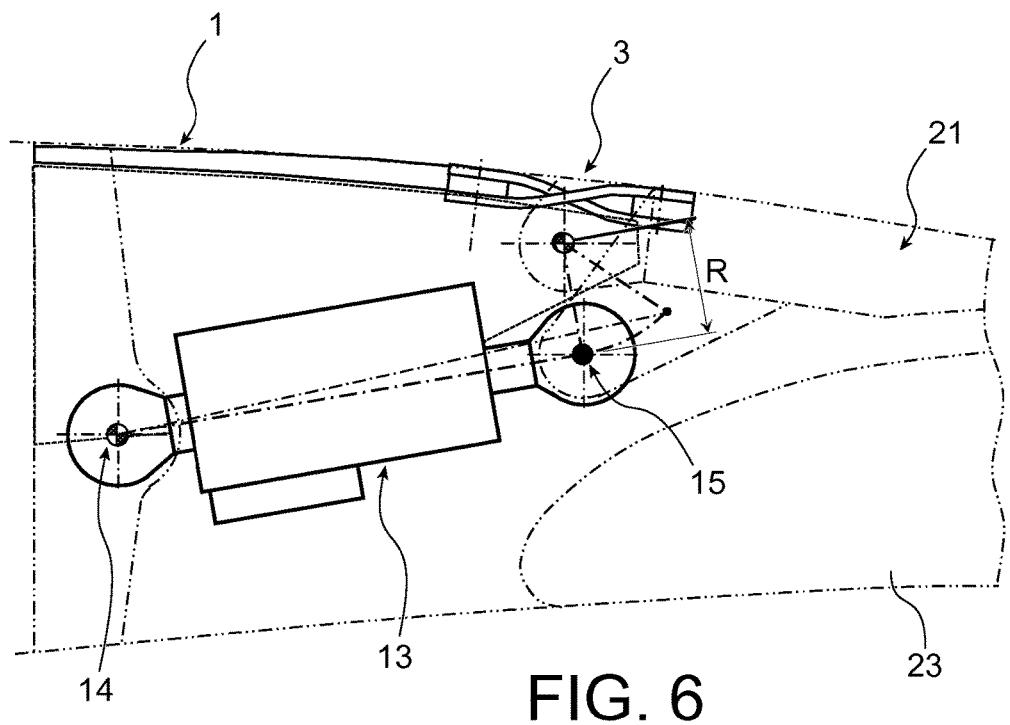
FIG. 6 shows another embodiment.

FIG. 6 shows an embodiment variant, applicable to a spoiler panel 21, which rests against a flap 23 which extends the wing 1 toward the rear. The characteristics of the preceding embodiment have not been changed; there are just a few variations in form or dimensions of a secondary nature.

The disclosure could be applied to any other pivotable aircraft panel, for example to the tailfin.

The number of hinges 3, for each movable panel, will be determined according to safety standards in order to maintain the strength of the connection and careful attention to the kinetics of rotation, even in the case of one of the hinges 3 breaking. The moderate elasticity of the plates 4 and 5 in directions other than the bending, however, allows the number of hinges 3 to be increased without having to utilize floating devices which are intended to restore the isostaticity of the assembly.

While at least one exemplary embodiment of the present disclosure has been shown and described, it should be understood that modifications, substitutions and alternatives may be apparent to one of ordinary skill in the art and can be made without departing from the scope of the disclosure described herein. This application is intended to cover any adaptations or variations of the specific embodiments discussed herein. In addition, in this disclosure, the terms "comprise" or "comprising" do not exclude other elements or steps, and the terms "a" or "one" do not exclude a plural number. Furthermore, characteristics or steps which have been described with reference to one of the above exemplary embodiments may also be used in combination with other characteristics or steps of other exemplary embodiments described above.

The invention claimed is:

1. An assembly comprising:
  a panel of an aircraft;
  a load-bearing structure of the aircraft;
  a hinge positioned between the panel and the load-bearing structure, wherein:
    the hinge comprises at least two plates which are comprised of a flexible, elastic material, each of the plates comprising a first end fixed to the panel, a second opposite end which is fixed to the load-bearing structure, and a free intermediate part between the panel and the load-bearing structure, the intermediate part of each of the at least two plates intersecting at an intersection point, and
    the first and second ends of each plate are directly connected to top portions of the panel and load-bearing structure, respectively; and
  an actuator arranged under the hinge and pivoted to the load-bearing structure at a first pivot point and to the panel at a second pivot point, wherein:
    a position of the first pivot point is fixed with respect to the load-bearing structure, and
    the second pivot point is aligned with the intersection point in a plane also comprising an axis of rotation about which the panel rotates, the plane being perpendicular to a longitudinal axis of the actuator passing through a first and second end of the actuator.

2. The assembly of claim 1, further comprising a first tongue associated with the panel and a second tongue associated with the load-bearing structure, the first and second tongues each comprising a bottom surface and a top surface, wherein:
the bottom and top surfaces of the first and second tongues are not coplanar with an outer surface of a respective outer surface of the load-bearing structure or panel;
the first ends of the at least two plates are each fixed on the bottom and top surfaces of the first tongue in an alternating fashion; and
the second ends of the at least two plates are each fixed on a different surface of the second tongue from the first tongue with regard to the intersection point.

3. The assembly of claim 1, wherein the hinge comprises at least three plates which are arranged at alternate angles along a direction of a connection between the panel and the load-bearing structure such that first ends of two adjacent plates are each respectively fixed on a different surface of a first tongue associated with the panel.

4. The assembly of claim 1, wherein the hinge further comprises a pliable sheet which covers the at least two plates and is fixed by opposite edges to the panel and to the load-bearing structure.

5. The assembly of claim 1, wherein the hinge further comprises an elastomer block in which the at least two plates are embedded.

6. An aircraft comprising at least one assembly of claim 1.

* * * * *